US012789998B1

(12) United States Patent
Eichler et al.

(10) Patent No.: US 12,789,998 B1
(45) Date of Patent: Nov. 10, 2026

(54) AUTOMATED AIRCRAFT SEATBELT SIGN CONTROL SYSTEM AND METHOD

(71) Applicant: HONEYWELL INTERNATIONAL INC., Charlotte, NC (US)

(72) Inventors: Zdenek Eichler, Brno (CZ); Helena Eichlerova, Brno (CZ); Gernot Konrad, Phoenix, AZ (US); Ivan Sandy Wyatt, Phoenix, AZ (US)

(73) Assignee: HONEYWELL AEROSPACE US LLC, Phoenix, AZ (US)

( * ) Notice: Subject to any disclaimer, the term of this patent is extended or adjusted under 35 U.S.C. 154(b) by 0 days.

(21) Appl. No.: 19/222,306

(22) Filed: May 29, 2025

(51) Int. Cl.
*B64D 11/06* (2006.01)
*B64D 43/00* (2006.01)
*B64D 47/02* (2006.01)

(52) U.S. Cl.
CPC ............ *B64D 11/062* (2014.12); *B64D 43/00* (2013.01); *B64D 47/02* (2013.01)

(58) Field of Classification Search
CPC ....... B64D 11/062; B64D 43/00; B64D 47/02
See application file for complete search history.

(56) References Cited

U.S. PATENT DOCUMENTS 3,475,963 A 11/1969 Astheimer
3,715,716 A * 2/1973 Stiegemeier ........... B64D 45/00 340/995.26
3,735,136 A 5/1973 Flint
9,719,785 B2 8/2017 Vasek et al.
10,391,972 B1 8/2019 Chengalva
10,430,883 B1 * 10/2019 Bischoff ................ G06Q 40/04
10,459,078 B2 10/2019 Khatwa et al.
10,796,586 B2 10/2020 Watts
11,767,116 B2 9/2023 Johnson
12,189,485 B2 1/2025 Hachiri
2007/0260366 A1 11/2007 Lacaze et al.
2009/0112638 A1 4/2009 Kneller et al.
2018/0074189 A1 * 3/2018 Khatwa .................. G01S 13/87
2018/0122247 A1 5/2018 Rizzi
2018/0247547 A1 8/2018 Karunakar et al.
2019/0266900 A1 8/2019 Eichler et al.
2021/0253255 A1 * 8/2021 Johnson .................. B60R 22/48
2025/0316175 A1 * 10/2025 Crawford ................. G08G 5/21

* cited by examiner

*Primary Examiner* — Rodney A Bonnette
(74) *Attorney, Agent, or Firm* — Ingrassia Fisher & Lorenz

(57) ABSTRACT

A system and method for automatically increasing the size of a seatbelt sign activation graphic includes rendering, in response to image rendering display commands supplied from a processing system, an image of a seatbelt sign activation graphic on a touchscreen display. Accelerometer data indicative of sensed accelerations of an aircraft airframe along multiple axes is supplied to an aircraft seatbelt alert subsystem, which processes the acceleration data to determine if the sensed accelerations of the aircraft airframe along one or more of the multiple axes exceeds an associated predetermined threshold magnitude. Image rendering display commands are generated and supplied to the touchscreen display that cause the seatbelt sign activation graphic to at least increase in size when an associated predetermined threshold magnitude is exceeded.

20 Claims, 4 Drawing Sheets

AUTOMATED AIRCRAFT SEATBELT SIGN CONTROL SYSTEM AND METHOD

TECHNICAL FIELD

The present disclosure relates to seatbelt signage on an aircraft, and more particularly to an automated aircraft seatbelt sign control system and method.

BACKGROUND

Touchscreen displays are increasingly being implemented in various technological environments. One environment that has seen such increased use is the aviation environment. The use of touchscreen displays in the aviation environment represents a significant advancement in cockpit technology, offering numerous benefits in terms of functionality, efficiency, and user experience.

In terms of specific implementations in the aviation environment, touchscreen displays are used for various avionics functions, from navigation and communication, to monitoring flight parameters and controlling aircraft systems. However, turbulence presents a unique set of challenges to the continued use and effectiveness of touchscreen displays. These challenges include potentially adverse impacts on input accuracy, stability, response time, and physical effort.

One specific aviation-related function that may be especially impacted by turbulence is the fasten seatbelt sign. The fasten seatbelt sign, which is activated via a seatbelt activation switch controlled by the flight crew, is considered a critical safety feature to ensure passenger safety during various phases of the flight by informing passengers when they need to fasten their seatbelts. One of the instances in which the fasten seatbelt sign is activated is when the aircraft is either encountering or is expected to encounter turbulence. However, when the aircraft is experiencing turbulence, it can be very challenging for a pilot to operate the seatbelt activation switch touch in a timely manner, especially when the switch is implemented on a touchscreen display.

Hence, there is a need for a system and method that can overcome the challenges of operating a seatbelt activation switch that is implemented on a touchscreen display, especially when the aircraft is either encountering or is expected to encounter turbulence. The present disclosure addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, an automated aircraft seatbelt sign control system includes a multi-axis accelerometer and an aircraft seatbelt alert subsystem. The multi-axis accelerometer is disposed on, and is configured to sense accelerations of, an aircraft airframe along multiple axes and to supply accelerometer data indicative of the sensed accelerations. The aircraft seatbelt alert subsystem is disposed on the aircraft airframe and is in operable communication with the multi-axis accelerometer. The aircraft seatbelt alert subsystem includes a touchscreen display and a processing system. The touchscreen display is configured, in response to image rendering display commands, to render an image of a seatbelt sign activation graphic that is responsive to user input to generate an activation signal. The processing system, which comprises at least one processor, is in operable communication with the touchscreen display. The processing system is coupled to receive the accelerometer data and is configured, upon receipt thereof, to: (i) determine if the acceleration of the aircraft airframe along one or more of the multiple axes exceeds an associated predetermined threshold magnitude, and (ii) when an associated predetermined threshold magnitude is exceeded, generate and supply image rendering display commands that cause the seatbelt sign activation graphic to at least increase in size.

In another embodiment, a method for automatically increasing the size of a seatbelt sign activation graphic includes rendering, in response to image rendering display commands supplied from a processing system, an image of a seatbelt sign activation graphic on a touchscreen display. Accelerometer data indicative of sensed accelerations of an aircraft airframe along multiple axes is supplied to a system, which processes the acceleration data to determine if the sensed accelerations of the aircraft airframe along one or more of the multiple axes exceeds an associated predetermined threshold magnitude. Image rendering display commands are generated and supplied to the touchscreen display that cause the seatbelt sign activation graphic to at least increase in size when an associated predetermined threshold magnitude is exceeded.

In yet another embodiment, an aircraft airframe includes an automated aircraft seatbelt sign control system disposed on the aircraft airframe. The automated aircraft seatbelt sign control system includes a multi-axis accelerometer and an aircraft seatbelt alert subsystem. The multi-axis accelerometer is configured to sense accelerations of the aircraft airframe along multiple axes and supply accelerometer data indicative of the sensed accelerations. The aircraft seatbelt alert subsystem is in operable communication with the multi-axis accelerometer and includes a touchscreen display and a processing system. The touchscreen display is configured, in response to image rendering display commands, to render an image of a seatbelt sign activation graphic that is responsive to user input to generate an activation signal. The processing system, which comprises at least one processor, is in operable communication with the touchscreen display. The processing system is coupled to receive the accelerometer data and is configured, upon receipt thereof, to: (i) determine if the acceleration of the aircraft airframe along one or more of the multiple axes exceeds an associated predetermined threshold magnitude, and (ii) when an associated predetermined threshold magnitude is exceeded, generate and supply image rendering display commands that cause the seatbelt sign activation graphic to at least increase in size.

Furthermore, other desirable features and characteristics of the automated aircraft seatbelt sign control system will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
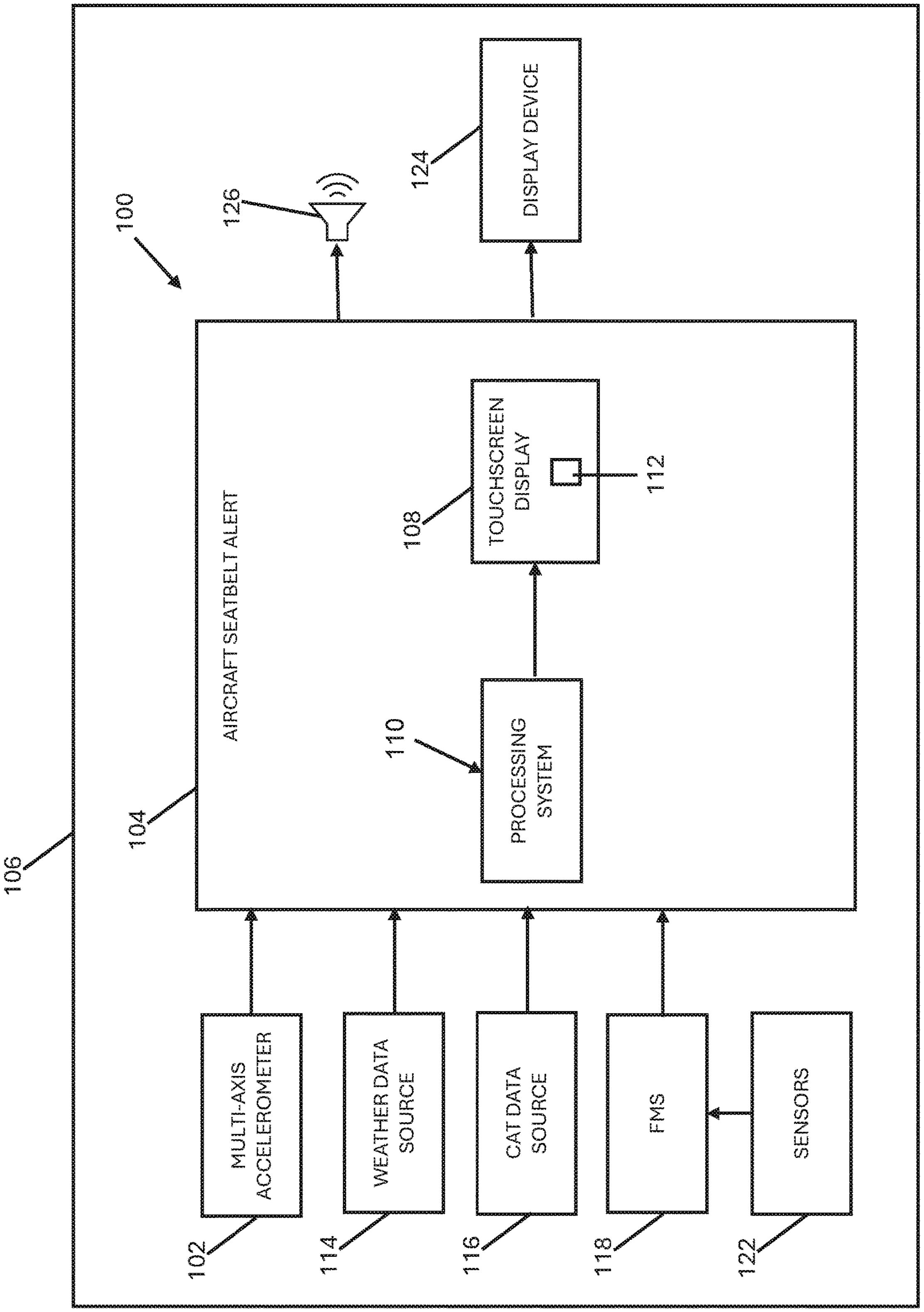
FIG. 1 depicts a functional block diagram of one embodiment of an automated aircraft seatbelt sign control system.

With the above in mind, and with reference now to FIG. 1, a functional block diagram of one embodiment of an automated aircraft seatbelt sign control system 100 is depicted. The depicted system 100 includes a multi-axis accelerometer 102 and an aircraft seatbelt alert subsystem 104, and is disposed on an aircraft airframe 106. The aircraft airframe 106 may be any one of numerous types of manned or unmanned aircraft airframes.

The multi-axis accelerometer 102 is disposed on the aircraft airframe 106. The multi-axis accelerometer 102 is configured to sense accelerations of the aircraft airframe 106 along multiple axes and to supply accelerometer data indicative of the sensed accelerations. More specifically, the multi-axis accelerometer 102 preferable senses accelerations of the aircraft airframe along three perpendicular axes (x, y, z), as illustrated in FIG. 1. The multi-axis accelerometer 102 may be implemented using separate, individual accelerometers for each axis, an integrated device that includes accelerometers for each axis, or using the accelerometers in the inertial reference system (IRS), if the aircraft airframe includes this system.

The aircraft seatbelt alert subsystem 104 is also disposed on the aircraft airframe 106 and is in operable communication with the multi-axis accelerometer 102. The aircraft seatbelt alert subsystem 104 includes a touchscreen display 108 and a processing system 110. The touchscreen display 108 is configured, in response to image rendering display commands, to render an image of a seatbelt sign activation graphic 112. The seatbelt sign activation graphic 112 is responsive to user input to generate an activation signal. The purpose of the activation signal will be described momentarily. It will be appreciated that the touchscreen display 108 may be implemented using any one of numerous types of touchscreen display devices now known or developed in the future.

The processing system 110 may include one or more processors and computer-readable storage devices or media encoded with programming instructions for configuring the processing system 110. The one or more processors may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller.

The processing system 110 includes at least one processor and is in operable communication with the touchscreen display 108. The processing system 110 is additionally coupled to receive the accelerometer data and is configured, upon receipt of the acceleration data, to determine if the acceleration of the aircraft airframe 106 along one or more of the multiple axes exceeds an associated predetermined threshold magnitude. For example, at least in the depicted embodiment, the processing system 110 determines if the acceleration of the aircraft airframe 106 along the x-axis exceeds an associated first predetermined threshold magnitude and/or if the acceleration of the aircraft airframe 106 along the y-axis exceeds an associated second predetermined threshold magnitude and/or if the acceleration of the aircraft airframe 106 along the z-axis exceeds an associated third predetermined threshold magnitude. It will be appreciated that the first, second, and third predetermined thresholds may be equal or unequal. It will additionally be appreciated that the specific threshold magnitudes of the first, second, and third predetermined thresholds may vary. For example, the specific threshold magnitudes may, in some embodiments, be tailored to different flight conditions, operations, and aircraft types. The predetermined threshold magnitudes may also be set using various types of artificial intelligence (AI) machine learning models.

Regardless of what each of the predetermined threshold magnitudes are set to, when an associated predetermined threshold magnitude is exceeded, the processing system 110 generates and supplies image rendering display commands to the touchscreen display 108 that cause the seatbelt sign activation graphic 112 to at least increase in size. In some embodiments, and depending on how the seatbelt activation graphic 112 is rendered, the image rendering display commands supplied from the processing system 110 may cause additional changes to the seatbelt activation graphic 112.

Figure 2:
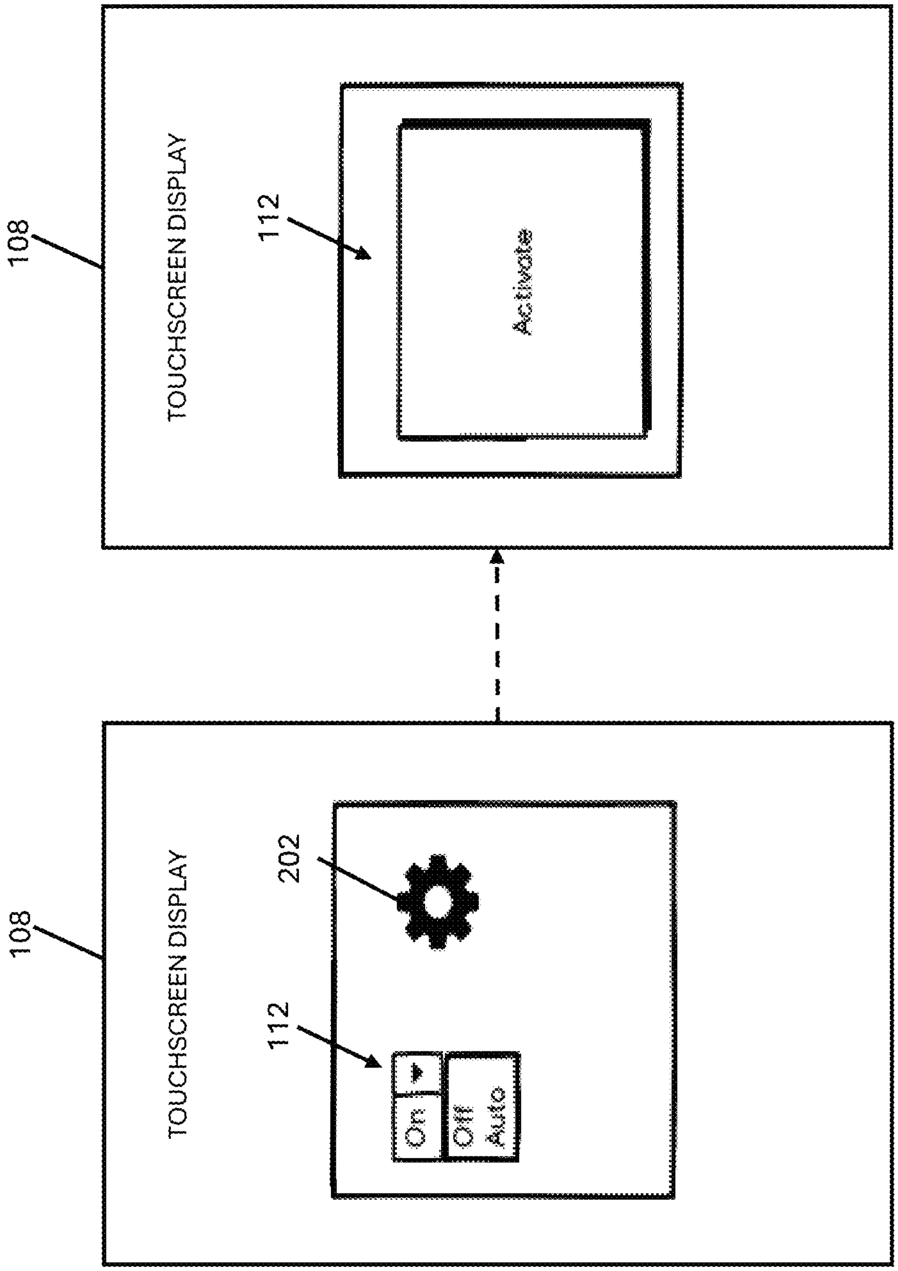
FIG. 2 depicts a transition is size of a seatbelt sign activation graphic on a touchscreen display.

For example, in the embodiment depicted in FIG. 2, when none of the associated predetermined threshold magnitudes are exceeded, the processing system 110 generates and supplies image rendering display commands to the touchscreen display 108 that cause the seatbelt sign activation graphic 112 to be rendered in a first size and in a drop-down menu format, which covers additional potential states (e.g., On, Off, Auto). However, when one or more associated predetermined threshold magnitudes is exceeded, the processing system 110 generates and supplies image rendering display commands to the touchscreen display 108 that cause the seatbelt sign activation graphic 112 to be rendered in a second size that is larger than the first size, and in a simple toggle button activation format (i.e., no drop-down menu). As FIG. 2 also depicts, the seatbelt sign activation graphic 112 may also, at least in the depicted embodiment, include a settings button 202. This settings button, when included, is no longer rendered when one or more associated predetermined threshold magnitudes is exceeded.

It will be appreciated that the difference between the first and second sizes may vary and may depend upon various factors. For example, the second size may be a preset size that is fixed for all types of aircraft airframes, or it may vary between different types of aircraft airframes. The second size may alternatively be user selectable, and input manually be a pilot. The second size may also be stored in a database and associated with individual pilots.

No matter what the difference is between the first and second sizes, it is noted that when the seatbelt sign activation graphic 112 receives a user input, an activation signal is generated, which in turn causes the processing system 110 to issue a command that causes the fasten seatbelt signs (not depicted) throughout the aircraft airframe 106 to illuminate.

The processing system 110 may additionally be configured to generate and supply image rendering display commands to the touchscreen display 108 that cause the seatbelt sign activation graphic 112 to increase in size in response to weather data and/or clear air turbulence (CAT) data. In this regard, and as FIG. 1 further depicts, the automated aircraft seatbelt sign control system 100 may, at least in some embodiments, include a weather data source 114 and/or a clear air turbulence (CAT) data source 116.

The weather data source 114, when included, is disposed on the aircraft airframe 106 and is configured to supply weather data representative of weather ahead of, and along the flight path of, the aircraft airframe 106. The weather data source 114 may be implemented using an on-board weather radar system and/or data link technology that continuously monitors and analyzes weather patterns along the flight path of the aircraft airframe 106.

Regardless of how the weather data source 114 is specifically implemented, the processing system 110 is further coupled to receive the weather data from the weather data source 114. The processing system 110 is further configured to process the weather data to determine if weather-related turbulence is expected at least a predetermined time ahead of, and along a flight path of, the aircraft airframe 106. When weather-related turbulence is expected at least the predetermined time ahead of, and along the flight path of, the aircraft airframe 106, the processing system 110 is further configured to generate and supply image rendering display commands that will cause the seatbelt sign activation graphic 112 to increase in size.

It will be appreciated that the predetermined time may vary and may depend, for example, on the current speed and location of the aircraft airframe 106 and the severity of the weather-related turbulence. The predetermined time may also be user selectable, and input manually be a pilot, and/or be set using various types of AI machine learning models.

Before proceeding further, it is noted that to facilitate this additional functionality, and as FIG. 1 further depicts, the processing system 110 may also be in operable communication with a flight management system (FMS) 118. The FMS 118, as is generally known, receives flight plan data and, using various sensors 122 (e.g., GPS, INS, etc.) to determine aircraft airframe position, guides the aircraft airframe 106 along the flight plan. Thus, the flight plan data in the FMS 118 can be used, together with the weather data, to determine if weather-related turbulence is expected at least a predetermined time ahead of, and along a flight path of, the aircraft airframe 106.

Turning now to the CAT data source 116, this data source, when included, is also disposed on the aircraft airframe 106 and is configured to supply CAT data representative of predicted CAT ahead of, and along a flight path of, the aircraft airframe 106. The CAT data source 116 may be implemented using an onboard data receiver that receives CAT data transmitted from various external sources, either on-ground or in the air (e.g., other aircraft) that predict CAT ahead of, and along a flight path of, the aircraft airframe 106. It is noted that CAT typically occurs without any visual warning signs like clouds or thunderstorms, and is not detectable by on-board weather radar, making this type of turbulence especially troublesome.

The processing system 110, when the CAT data source 116 is included, is further coupled to receive the CAT data from the CAT data source 116 and is further configured to process the CAT data to determine if CAT is expected at least the predetermined time ahead of, and along a flight path of, the aircraft airframe 106. When CAT is expected at least the predetermined time ahead of, and along the flight path of, the aircraft airframe 106, the processing system 110 is further configured to generate and supply image rendering display commands that cause the seatbelt sign activation graphic 112 to increase in size.

It will also be appreciated that the predetermined time may vary and may depend, for example, on the current speed and location of the aircraft airframe 106 and the severity of the CAT. The predetermined time may also be user selectable, and input manually be a pilot, and/or be set using various types of AI machine learning models.

As with the weather-related turbulence determination, the flight plan data in the FMS 118 can also be used, together with the CAT data, to determine if CAT is expected at least a predetermined time ahead of, and along a flight path of, the aircraft airframe 106.

Figure 3:
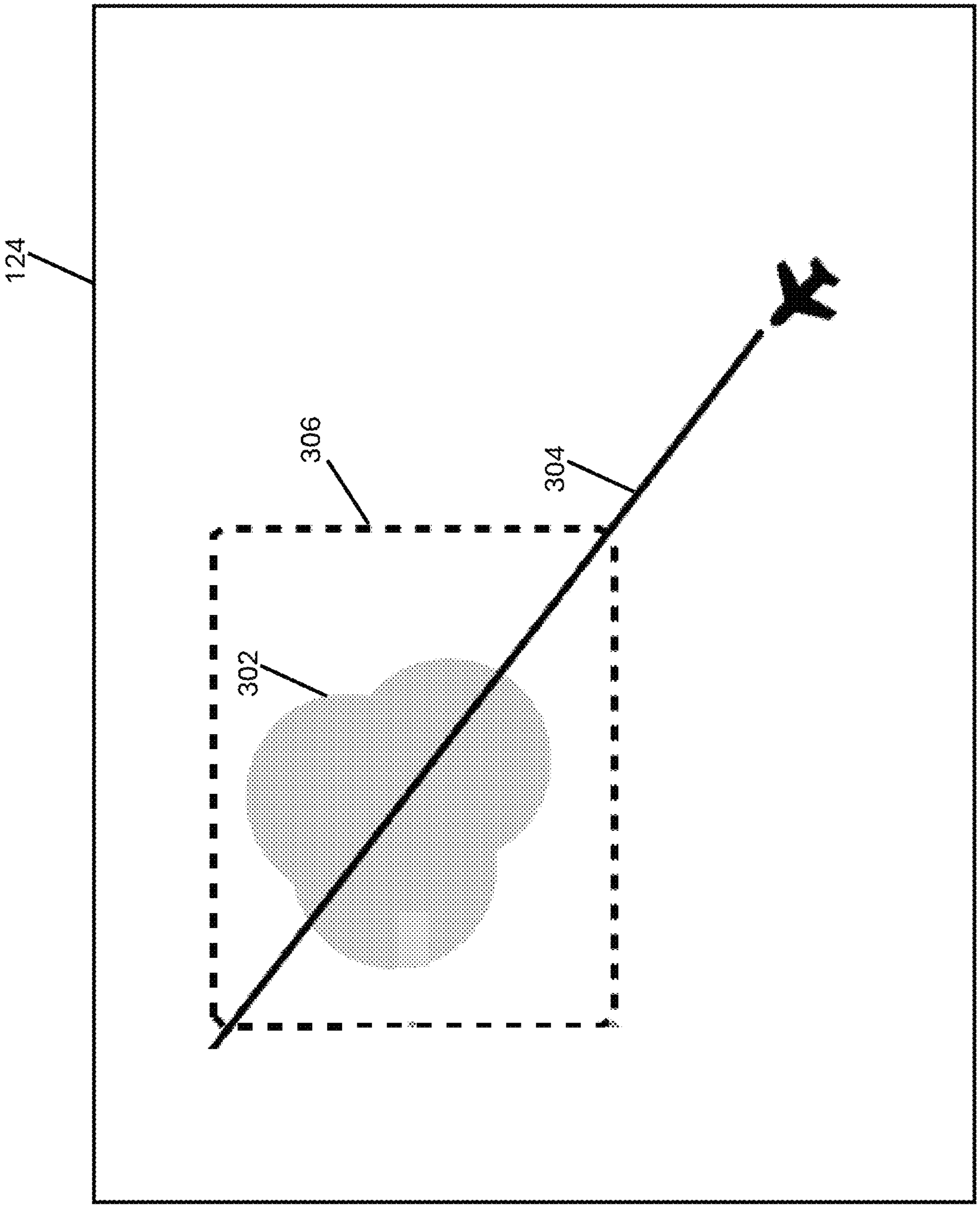
FIG. 3 depicts a display device rendering an image that includes symbology indicative of the position of weather-related turbulence and/or CAT along a flight path and symbology indicative of an area around the position of the weather-related turbulence and/or CAT in which seatbelt signs should be activated.

The system 100 may additionally include one or more other display devices 124 (only one depicted). The display device 124 is disposed on the aircraft airframe 106 and is responsive to image rendering display commands to display one or more images. In some embodiments, the processing system 110 is in operable communication with the display device 124 and is further configured, upon determining that weather-related turbulence and/or CAT is expected at least the predetermined time ahead of, and along the flight path of, the aircraft airframe, to supply image rendering display commands to the display device 124. As FIG. 3 illustrates, the image rendering display commands cause the display device 124 to render an image that includes symbology 302 indicative of the position of the weather-related turbulence and/or CAT along the flight path 304, and symbology 306 indicative of an area around the position of the weather-related turbulence and/or CAT in which the seatbelt signs should be activated. It will be appreciated that the one or more other display devices 124 may be dedicated cockpit displays and/or displays in the passenger cabin, such as various in-flight entertainment displays.

The aircraft seatbelt alert subsystem 104 may additionally be configured, at least in some embodiments, to selectively generate one or more one when an associated predetermined threshold magnitude is exceeded and/or when weather-related turbulence is expected at least the predetermined time ahead of, and along the flight path of, the aircraft airframe 106 and/or when CAT is expected at least the predetermined time ahead of, and along the flight path of, the aircraft airframe 106. It will be appreciated that the one or more alerts may include one or more of a visual alert, an aural alert, or both. To generate an aural alert, the system 100 may additionally include a suitable speaker 126. In some embodiments, the one or more alerts may include advice to the flight crew to decrease speed to an optimal turbulence penetration speed.

Figure 4:
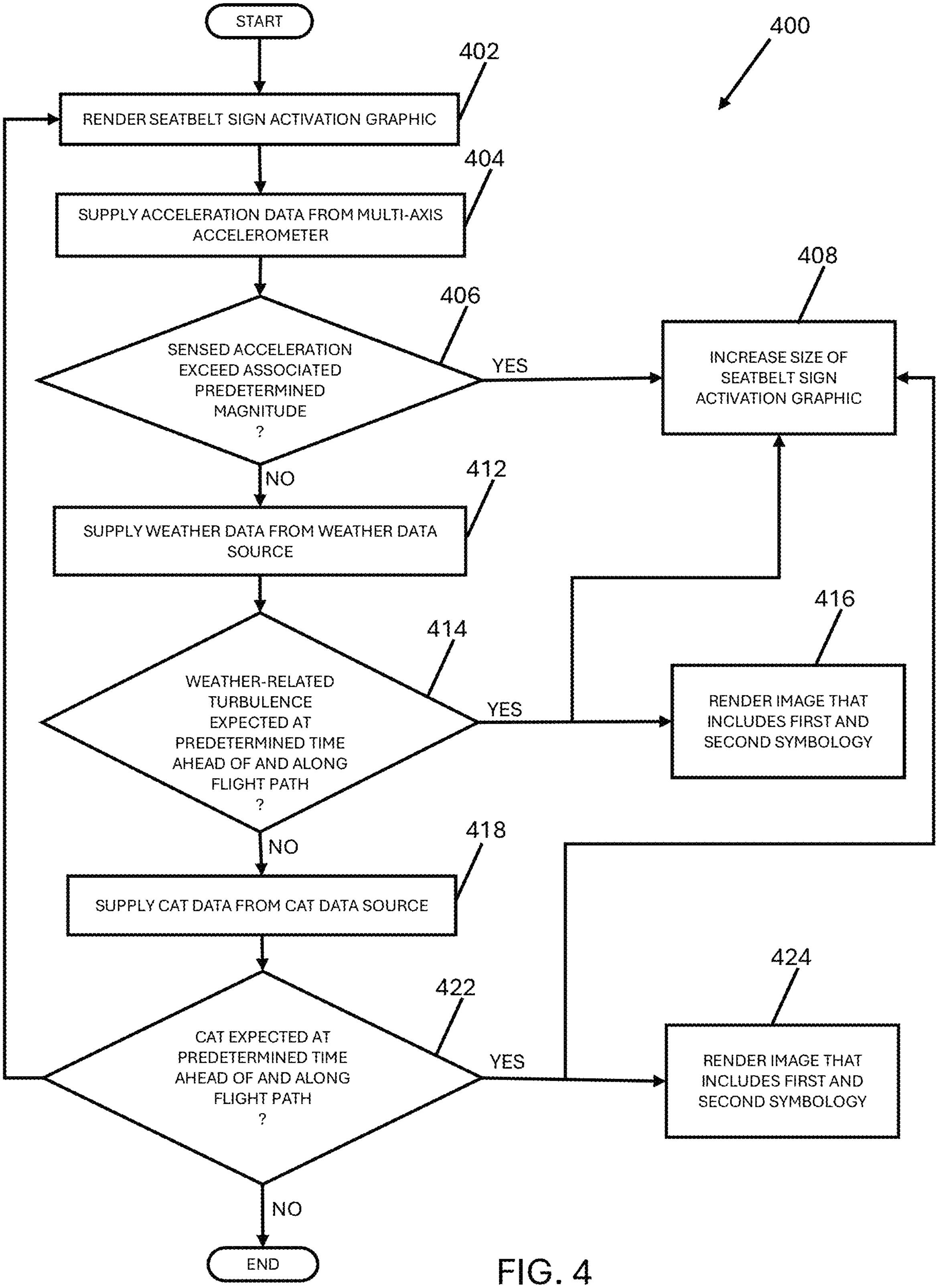
FIG. 4 depicts a method, in flowchart form, that may be implemented in the system of FIG. 1.

Having described the overall functionality of the automated aircraft seatbelt sign control system 100, a description of a method for automatically increasing the size of a seatbelt sign activation graphic will now be described. The method 400, which is depicted in flowchart form in FIG. 4, represents various embodiments of a method for selectively automatically increasing the size of a seatbelt sign activation graphic. For illustrative purposes, the following description of method 400 may refer to elements mentioned above in connection with FIGS. 1-3. In practice, portions of method 400 may be performed by different components of the described system 100. It should be appreciated that method 400 may include any number of additional or alternative tasks, the tasks shown in FIG. 4 need not be performed in the illustrated order, and method 400 may be incorporated into a more comprehensive procedure or method having additional functionality not described in detail herein. Moreover, one or more of the tasks shown in FIG. 4 could be omitted from an embodiment of the method 400 if the intended overall functionality remains intact.

The method 400 starts and an image of the seatbelt sign activation graphic 112 is rendered on the touchscreen display 108 in response to image rendering display commands supplied from the processing system 110 (402). Accelerometer data indicative of sensed accelerations of an aircraft airframe along multiple axes supplying is supplied from the multi-axis accelerometer 102 (404). The acceleration data is processed in the processing system 110 to determine if the sensed accelerations of the aircraft airframe along one or more of the multiple axes exceeds an associated predetermined threshold magnitude (406). If not, then the method 400 proceeds; However, if an associated predetermined threshold magnitude is exceeded, then image rendering display commands are generated and supplied from the processing system 110 to the touchscreen display 108 that cause the seatbelt sign activation graphic 112 to increase in size (408).

As FIG. 4 also depicts, the method 400 may also, at least in some embodiments, include supplying weather data from the weather data source 114 to the processing system (412). The weather data is processed in the processing system 110 to determine if weather-related turbulence is expected at least the predetermined time ahead of, and along a flight path of, the aircraft airframe 106 (414). If not, then the method 400 proceeds. However, if weather-related turbulence is expected at least the predetermined time ahead of, and along the flight path of, the aircraft airframe 106, then image rendering display commands are generated and supplied from the processing system 110 that cause the seatbelt sign activation graphic 112 to increase in size (408). The method 400 may also include supplying image rendering display commands to the display device 124 that cause the display device 124 to render an image that includes at least the symbology 302 and the symbology 306 (416).

The method 400 may additionally include, at least in some embodiments, supplying CAT data from the CAT data source 116 to the processing system 110 (418). The CAT data is processed in the processing system 110 to determine if CAT is expected at least the predetermined time ahead of, and along a flight path of, the aircraft airframe 106 (422). If not, then the method 400 proceeds. However, if CAT is expected at least the predetermined time ahead of, and along the flight path of, the aircraft airframe 106, then image rendering display commands are generated and supplied from the processing system 110 that cause the seatbelt sign activation graphic 112 to increase in size (408). The method 400 may also include supplying image rendering display commands to the display device 124 that cause the display device 124 to render an image that includes at least the symbology 302 and the symbology 306 (424).

As is generally known, turbulence can cause unsteady hand movements, which can lead to difficulty in accurately selecting options on a touchscreen display, which can in turn result in incorrect inputs or missed commands. The physical jostling caused by turbulence can also make it challenging for pilots to maintain steady contact with the touchscreen, disrupting workflow and increasing the risk of errors. During severe turbulence, pilots may need to focus more on maintaining control of the aircraft, directing attention away from various touchscreen display interactions, and thereby increasing response times for such interactions. Turbulence may also cause the pilot(s) to brace themselves to maintain a steady posture while simultaneously trying to interact with one or more touchscreen displays. This can result in tensing muscles and extra effort to keep their hands stable, thereby increasing physical effort and leading to fatigue. The system and method described herein overcomes the challenges of operating a seatbelt activation switch that is implemented on a touchscreen display, especially when the aircraft is either encountering or is expected to encounter turbulence.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An automated aircraft seatbelt sign control system, comprising:

a multi-axis accelerometer disposed on, and configured to sense accelerations of, an aircraft airframe along multiple axes and supply accelerometer data indicative of the sensed accelerations; and an aircraft seatbelt alert subsystem disposed on the aircraft airframe and in operable communication with the multi-axis accelerometer, the aircraft seatbelt alert subsystem including:

a touchscreen display that is configured, in response to image rendering display commands, to render an image of a seatbelt sign activation graphic, the seatbelt sign activation graphic responsive to user input to generate an activation signal, and a processing system, comprising at least one processor, and in operable communication with the touchscreen display, the processing system coupled to receive the activation signal, when generated, and configured, upon receipt thereof, to issue a command that causes a plurality of fasten seatbelt signs to illuminate, the processing system further coupled to receive the accelerometer data and further configured, upon receipt thereof, to:

(i) determine if the acceleration of the aircraft airframe along one or more of the multiple axes exceeds an associated predetermined threshold magnitude, and (ii) when an associated predetermined threshold magnitude is exceeded, generate and supply image rendering display commands that cause the seatbelt sign activation graphic to at least increase in size, the processing system further.

2. The system of claim 1, further comprising:

a weather data source disposed on the aircraft airframe, the weather data source configured to supply weather data representative of weather ahead of, and along a flight path of, the aircraft airframe, wherein the processing system is further coupled to receive the weather data from the weather data source and is further configured, upon receipt thereof, to process the weather data to:

(i) determine if weather-related turbulence is expected at least a predetermined time ahead of, and along a flight path of, the aircraft airframe, and (ii) when weather-related turbulence is expected at least the predetermined time ahead of, and along the flight path of, the aircraft airframe, generate and supply image rendering display commands that cause the seatbelt sign activation graphic to at least increase in size.

3. The system of claim 2, further comprising:

a display device disposed on the aircraft airframe, the display device responsive to image rendering display commands to display one or more images, wherein the processing system is in operable communication with the display device and is further configured, upon determining that weather-related turbulence is expected at least the predetermined time ahead of, and along the flight path of, the aircraft airframe, to supply image rendering display commands to the display device that cause the display device to render an image that includes (i) first symbology indicative of a position of the weather-related turbulence and (ii) second symbology indicative of an area around the position of the weather-related turbulence in which seatbelt signs should be activated.

4. The system of claim 1, further comprising:

a clear air turbulence (CAT) data source disposed within the aircraft airframe, the CAT data source configured to supply CAT data representative of predicted CAT ahead of, and along a flight path of, the aircraft airframe, wherein the processing system is further coupled to receive the CAT data from the CAT data source and is further configured, upon receipt thereof, to process the CAT data to:

(i) determine if CAT is expected at least a predetermined time ahead of, and along a flight path of, the aircraft airframe, and (ii) when CAT is expected at least the predetermined time ahead of, and along the flight path of, the aircraft airframe, generate and supply image rendering display commands that cause the seatbelt sign activation graphic to at least increase in size.

5. The system of claim 4, further comprising:

a display device disposed on the aircraft airframe, the display device responsive to image rendering display commands to display one or more images, wherein the processing system is in operable communication with the display device and is further configured, upon determining that CAT is expected at least the predetermined time ahead of, and along the flight path of, the aircraft airframe, to supply image rendering display commands to the display device that cause the display device to render an image that includes (i) first symbology indicative of a position of the CAT and (ii) second symbology indicative of an area around the position of the CAT in which the seatbelt signs should be activated.

6. The system of claim 4, wherein the CAT data source comprises a data receiver configured to receive the CAT data, which has been transmitted at least to the aircraft airframe, and supply the CAT data to the processing system.

7. The system of claim 1, wherein:

the aircraft seatbelt alert subsystem is further configured to selectively generate one or more alerts; and the one or more alerts include one or more of a visual alert, an aural alert, or both.

8. A method for automatically increasing the size of a seatbelt sign activation graphic, the method comprising the steps of:

rendering, in response to image rendering display commands supplied from a processing system, an image of a seatbelt sign activation graphic on a touchscreen display;

supplying, in response to user input being supplied to the seatbelt sign activation graphic, an activation signal to the processing system;

commanding, by the processing system, in response to the activation signal, a plurality of fasten seatbelt signs to illuminate;

supplying accelerometer data indicative of sensed accelerations of an aircraft airframe along multiple axes;

processing the acceleration data in the processing system to determine if the sensed accelerations of the aircraft airframe along one or more of the multiple axes exceeds an associated predetermined threshold magnitude, and generating and supplying image rendering display commands to the touchscreen display that cause the seatbelt sign activation graphic to at least increase in size when an associated predetermined threshold magnitude is exceeded.

9. The method of claim 8, further comprising:

supplying weather data from a weather data source to the processing system, the weather data representative of weather ahead of, and along a flight path of, the aircraft airframe;

processing the weather data in the processing system to determine if weather-related turbulence is expected at least a predetermined time ahead of, and along a flight path of, the aircraft airframe; and generating and supplying image rendering display commands that cause the seatbelt sign activation graphic to at least increase in size when weather-related turbulence is expected at least the predetermined time ahead of, and along the flight path of, the aircraft airframe.

10. The method of claim 9, further comprising, upon determining that weather-related turbulence is expected at least the predetermined time ahead of, and along the flight path of, the aircraft airframe:

supplying image rendering display commands to a display device that cause the display device to render an image that includes (i) first symbology indicative of a position of the weather-related turbulence and (ii) second symbology indicative of an area around the position of the weather-related turbulence in which seatbelt signs should be activated.

11. The method of claim 8, further comprising:

supplying clear air turbulence (CAT) data from a CAT data source to the processing system, the CAT data representative of predicted CAT ahead of, and along a flight path of, the aircraft airframe;

processing the CAT data in the processing system to determine if CAT is expected at least a predetermined time ahead of, and along a flight path of, the aircraft airframe; and generating and supplying image rendering display commands that cause the seatbelt sign activation graphic to at least increase in size when CAT is expected at least the predetermined time ahead of, and along the flight path of, the aircraft airframe.

12. The method of claim 11, further comprising, upon determining that CAT is expected at least the predetermined time ahead of, and along the flight path of, the aircraft airframe:

supplying image rendering display commands to a display device that cause the display device to render an image that includes (i) first symbology indicative of a position of the CAT and (ii) second symbology indicative of an area around the position of the CAT in which seatbelt signs should be activated.

13. The method of claim 8, further comprising selectively generating one or more alerts at least when the seatbelt sign activation graphic is increased in size.

14. An aircraft airframe, comprising:

an automated aircraft seatbelt sign control system disposed on the aircraft airframe, the automated aircraft seatbelt sign control system, comprising:

a multi-axis accelerometer configured to sense accelerations of the aircraft airframe along multiple axes and supply accelerometer data indicative of the sensed accelerations; and an aircraft seatbelt alert subsystem in operable communication with the multi-axis accelerometer, the aircraft seatbelt alert subsystem including:

a touchscreen display that is configured, in response to image rendering display commands, to render an image of a seatbelt sign activation graphic, the seatbelt sign activation graphic responsive to user input to generate an activation signal, and a processing system, comprising at least one processor, and in operable communication with the touchscreen display, the processing system coupled to receive the activation signal, when generated, and configured, upon receipt thereof, to issue a command that causes a plurality of fasten seatbelt signs throughout the aircraft to illuminate, the processing system further coupled to receive the accelerometer data and further configured, upon receipt thereof, to:

(i) determine if the acceleration of the aircraft airframe along one or more of the multiple axes exceeds an associated predetermined threshold magnitude, and (ii) when an associated predetermined threshold magnitude is exceeded, generate and supply image rendering display commands that cause the seatbelt sign activation graphic to at least increase in size.

15. The aircraft airframe of claim 14, further comprising:

a weather data source configured to supply weather data representative of weather ahead of, and along a flight path of, the aircraft airframe, wherein the processing system is further coupled to receive the weather data from the weather data source and is further configured, upon receipt thereof, to process the weather data to:

(i) determine if weather-related turbulence is expected at least a predetermined time ahead of, and along a flight path of, the aircraft airframe, and (ii) when weather-related turbulence is expected at least the predetermined time ahead of, and along the flight path of, the aircraft airframe, generate and supply image rendering display commands that cause the seatbelt sign activation graphic to at least increase in size.

16. The aircraft airframe of claim 15, further comprising:

a display device disposed on the aircraft airframe, the display device responsive to image rendering display commands to display one or more images, wherein the processing system is in operable communication with the display device and is further configured, upon determining that weather-related turbulence is expected at least the predetermined time ahead of, and along the flight path of, the aircraft airframe, to supply image rendering display commands to the display device that cause the display device to render an image that includes (i) first symbology indicative of a position of the weather-related turbulence and (ii) second symbology indicative of an area around the position of the weather-related turbulence in which seatbelt signs should be activated.

17. The aircraft airframe of claim 14, further comprising:

a clear air turbulence (CAT) data source disposed within the aircraft airframe, the CAT data source configured to supply CAT data representative of predicted CAT ahead of, and along a flight path of, the aircraft airframe, wherein the processing system is further coupled to receive the CAT data from the CAT data source and is further configured, upon receipt thereof, to process the CAT data to:

(i) determine if CAT is expected at least a predetermined time ahead of, and along a flight path of, the aircraft airframe, and (ii) when CAT is expected at least the predetermined time ahead of, and along the flight path of, the aircraft airframe, generate and supply image rendering display commands that cause the seatbelt sign activation graphic to at least increase in size.

18. The aircraft airframe of claim 17, further comprising:

a display device disposed on the aircraft airframe, the display device responsive to image rendering display commands to display one or more images, wherein the processing system is in operable communication with the display device and is further configured, upon determining that CAT is expected at least the predetermined time ahead of, and along the flight path of, the aircraft airframe, to supply image rendering display commands to the display device that cause the display device to render an image that includes (i) first symbology indicative of a position of the CAT and (ii) second symbology indicative of an area around the position of the CAT in which the seatbelt signs should be activated.

19. The aircraft airframe of claim 18, wherein the CAT data source comprises a data receiver configured to receive the CAT data, which has been transmitted at least to the aircraft airframe, and supply the CAT data to the processing system.

20. The aircraft airframe of claim 14, wherein:

the aircraft seatbelt alert subsystem is further configured to selectively generate one or more alerts; and the one or more alerts include one or more of a visual alert, an aural alert, or both.

* * * * *